United States Patent
Hatch et al.

(10) Patent No.: US 10,108,933 B1
(45) Date of Patent: Oct. 23, 2018

(54) EXCHANGING LEAVE TIME FOR A RELATED VALUE

(71) Applicant: PTO, Inc., Woodinville, WA (US)

(72) Inventors: Gregory Jon Hatch, Stanwood, WA (US); Todd Comnenos Lucas, Woodinville, WA (US); Robert Shannon Whalen, Woodinville, WA (US); Steven Craig Armstrong, Woodinville, WA (US)

(73) Assignee: PTO, Inc., Woodinville, WA (US)

( * ) Notice: Subject to any disclaimer, the term of this patent is extended or adjusted under 35 U.S.C. 154(b) by 1050 days.

(21) Appl. No.: 14/181,457

(22) Filed: Feb. 14, 2014

Related U.S. Application Data

(60) Provisional application No. 61/765,040, filed on Feb. 15, 2013.

(51) Int. Cl.
*G06Q 30/06* (2012.01)
*G06Q 10/10* (2012.01)

(52) U.S. Cl.
CPC ..... *G06Q 10/1057* (2013.01); *G06Q 30/0633* (2013.01)

(58) Field of Classification Search
CPC .......................................... G06Q 30/06–30/08
USPC ............................................... 705/26.1–27.2
See application file for complete search history.

(56) References Cited

U.S. PATENT DOCUMENTS

| | | |
|---|---|---|
| 6,594,640 B1 | 7/2003 | Postrel |
| 8,407,114 B2 | 3/2013 | Smith |
| 2013/0103484 A1* | 4/2013 | McLaughlin ...... G06Q 30/0226 705/14.33 |

OTHER PUBLICATIONS

University of Minnesota, http://web.archive.org/web/20081007194416/http://www1.umn.edu/ohr/policies/governing/unit1contract/article17/index.html, Oct. 7, 2008.*

"Is Allowing Employees to Sell Their Vacation Time a Wise Move?," N. Nayab, Jun. 21, 2011, available at http://www.brighthub.com/office/human-resources/articles/119830.aspx.*

* cited by examiner

*Primary Examiner* — Ming Shui
(74) *Attorney, Agent, or Firm* — Fenwick & West LLP

(57) ABSTRACT

When a trading system receives a request from an employee to trade leave time for a related value, the trading system communicates with an employer system to request a value of leave time accrued by the employee. The employer system transmits the value of leave time to the trading system, and the trading system converts the value of leave time into a related value. Through the trading system, the employee can use the related value to purchase items from one or more merchants.

13 Claims, 4 Drawing Sheets

EXCHANGING LEAVE TIME FOR A RELATED VALUE

CROSS-REFERENCE TO RELATED APPLICATIONS

This application claims the benefit of U.S. provisional application 61/765,040, filed on Feb. 15, 2013, which is incorporated by reference herein in its entirety.

BACKGROUND

1. Field of the Embodiments

The embodiments pertain in general to the management of employee benefits, and more specifically to using accrued leave time for purchasing items from merchants.

2. Description of the Related Art

During the course of employment with a company, employees typically accumulate leave time, such as vacation time or paid time off. This accumulated leave time often can only be used to take time off of work. However, employees often do not use all of their leave time and can end up accruing a large amount of time. Therefore, if an employee is accruing leave time but not using it, the leave time has little value to the employee.

BRIEF SUMMARY

Methods, computer program products, and computer systems are described for allowing employees to use leave time to purchase items (e.g., goods and services) from merchants. When a trading system receives a request from an employee to trade leave time for a related value, the trading system communicates with an employer system to request a value of leave time accrued by the employee from an employer. The employer system transmits the value of leave time to the trading system, and the trading system converts the value of leave time into a related value. Through the trading system, the employee can request to use the related value to shop with one or more merchants. The trading system transmits the related value to a merchant system associated with a merchant selected by the employee for shopping. When the employee selects one or more items to purchase from the merchant, the related value is used to purchase the items. The employee can also request to convert accrued leave time into a monetary value that is payable directly to the employee.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Figure 1:
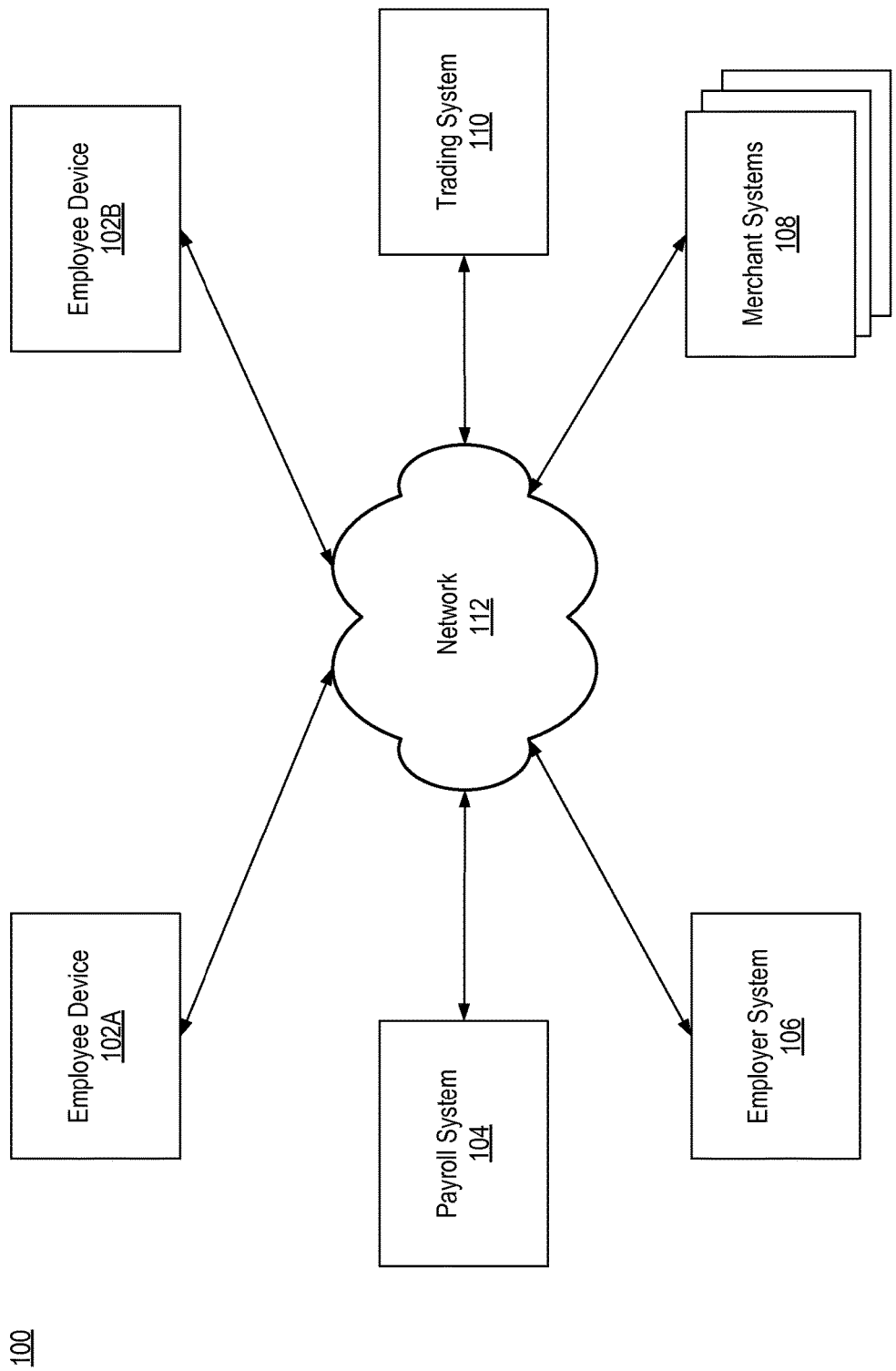
FIG. 1 is a high-level block diagram of a leave time trading environment according to one embodiment.

FIG. 1 is a high-level block diagram of a leave time trading environment 100 according to one embodiment. FIG. 1 illustrates employee devices 102A and 102B, a payroll system 104, an employer system 106, multiple merchant systems 108, and a trading system 110 connected via a network 112. Although a select number of each entity are shown in FIG. 1, embodiments can have more or less of each entity (e.g., additional employee devices 102 and employer systems 106).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

An employee device 102 is a device used by an employee of an employer to communicate with entities connected to the network 112. An employee may also be referred to as a "user" herein. An employee device 102 may be, for example, a personal computer, smart phone, tablet computer, or personal digital assistant (PDA). Employee devices 102 may connect to the network 112 via wireless or wired connections.

The payroll system 104 is a computer system that performs payment transactions. Upon request (e.g., from the employer system 106 or the trading system 110), the payroll system 104 provides payments to individuals or organizations. In one embodiment, the payroll system 104 provides payments to employees on behalf of employers. The payroll system 104 may provide a payment by initiating a transfer of funds between two bank accounts. For example, the payroll system 104 may initiate a transfer of funds from an employer bank account to an employee bank account. The payroll system 104 may also provide a payment by generating a check that orders payment of funds from a bank account (e.g., an employer bank account).

In one embodiment, the payroll system 104 is the electric system of a financial institution, such as a bank. In one embodiment, the payroll system 104 is part of an electronic system of an employer.

The employer system 106 is a computer system that stores employee information. The employer system 106 stores employee information for employees of one or more employers. For each employee, the employee information stored includes a wage rate of the employee (e.g., yearly, monthly or hourly salary) and leave time accrued by the employee. Leave time may include one or more of the following: vacation time, paid time off, personal time, sick time, and any other time where an employer pays an employee for non-working time (time spent not working). When an employee accrues additional leave time based on policy rules defined by an employer, the employer system 106 updates the stored leave time of the employee. In one embodiment, the employer system 106 is part of an electronic system of an employer.

A merchant system 108 is a computer system that allows employees to acquire items from a merchant. A merchant system 108 allows employees to search for and view items offered for sale by a merchant. In one embodiment, each merchant system 108 is operated and associated with a specific merchant. When an employee requests to purchase one or more items from a merchant system 108, the merchant system 108 guides the employee through a checkout process to complete the purchase. The items that may be acquired through a merchant system 108 may include tangible items (e.g., electronic devices, shoes, and clothing), intangible items (e.g., music files and movies), and services (e.g., massages and tutoring sessions).

A merchant may have a direct relationship with the trading system 110, where the direct relationship affords a streamlined process for allowing an employee to acquire items offered via a merchant system 108 operated by the merchant. In one embodiment, even if a merchant does not have a direct relationship with the trading system 110, employers can still acquire items from the merchant through the merchant's merchant system 108

In one embodiment, a merchant system 108 may be associated with a charitable organization. Through the merchant system 108 an employee can make a donation to the charitable organization.

The trading system 110 is a computer system that allows employees to use accrued leave time to purchase items from merchants. Each employee that has a value account with the trading system 110 can request to convert leave time accrued with an employer to a related value. The trading system 110 converts an employee's leave time to a related value based on policy rules, which may be setup by the employee's employer. Through the trading system 110, an employee can use related value associated with the employee's value account to purchase items from one or more merchants.

The network 112 represents the communication pathways between the employee devices 102, payroll system 104, employer system 106, merchant systems 108, and trading system 110. In one embodiment, the network 112 is the Internet and uses standard communications technologies and/or protocols. Thus, the network 112 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 112 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 112 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
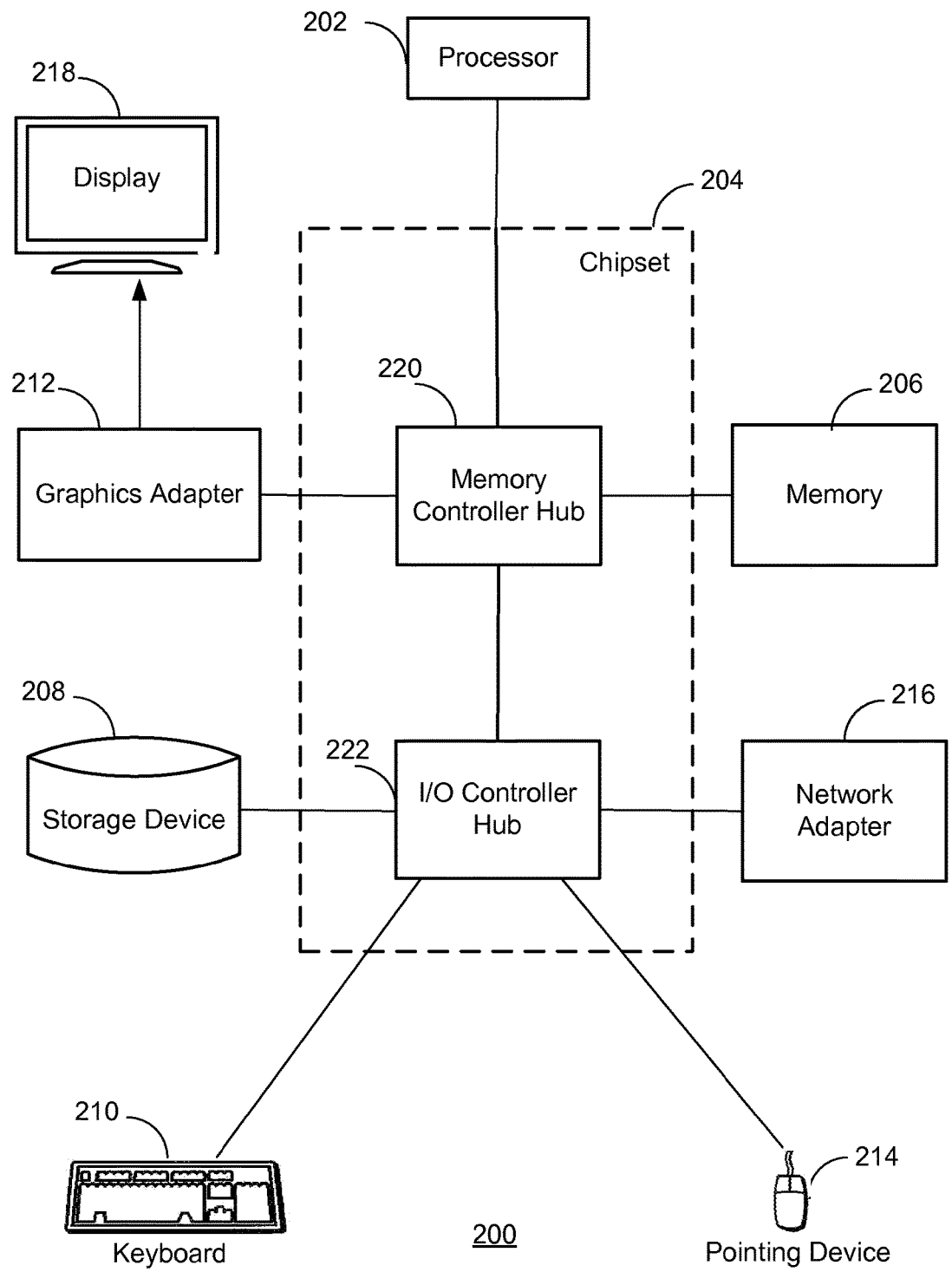
FIG. 2 is a high-level block diagram illustrating a functional view of a typical computer system for use as one of the entities illustrated in the environment of FIG. 1 according to an embodiment.

FIG. 2 is a high-level block diagram illustrating a functional view of a typical computer system for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

As is known in the art, a computer 200 can have different and/or other components than those shown in FIG. 2. In addition, the computer 200 can lack certain illustrated components. For example, a computer system 200 acting as a payroll system 104 or an employer system 106 may lack a keyboard 210 and a pointing device 214. Moreover, the storage device 208 can be local and/or remote from the computer 200 (such as embodied within a storage area network (SAN)).

The computer 200 is adapted to execute computer program modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 208, loaded into the memory 206, and executed by the processor 202.

The types of computer systems 200 used by the entities of FIG. 1 can vary depending upon the embodiment and the processing power used by the entity. For example, an employee device 102 that is a mobile phone typically has limited processing power, a small display 218, and might lack a pointing device 214. The payroll system 104, employer system 106, merchant systems 108, and trading system 110, in contrast, may comprise multiple blade servers working together to provide the functionality described herein.

Figure 3:
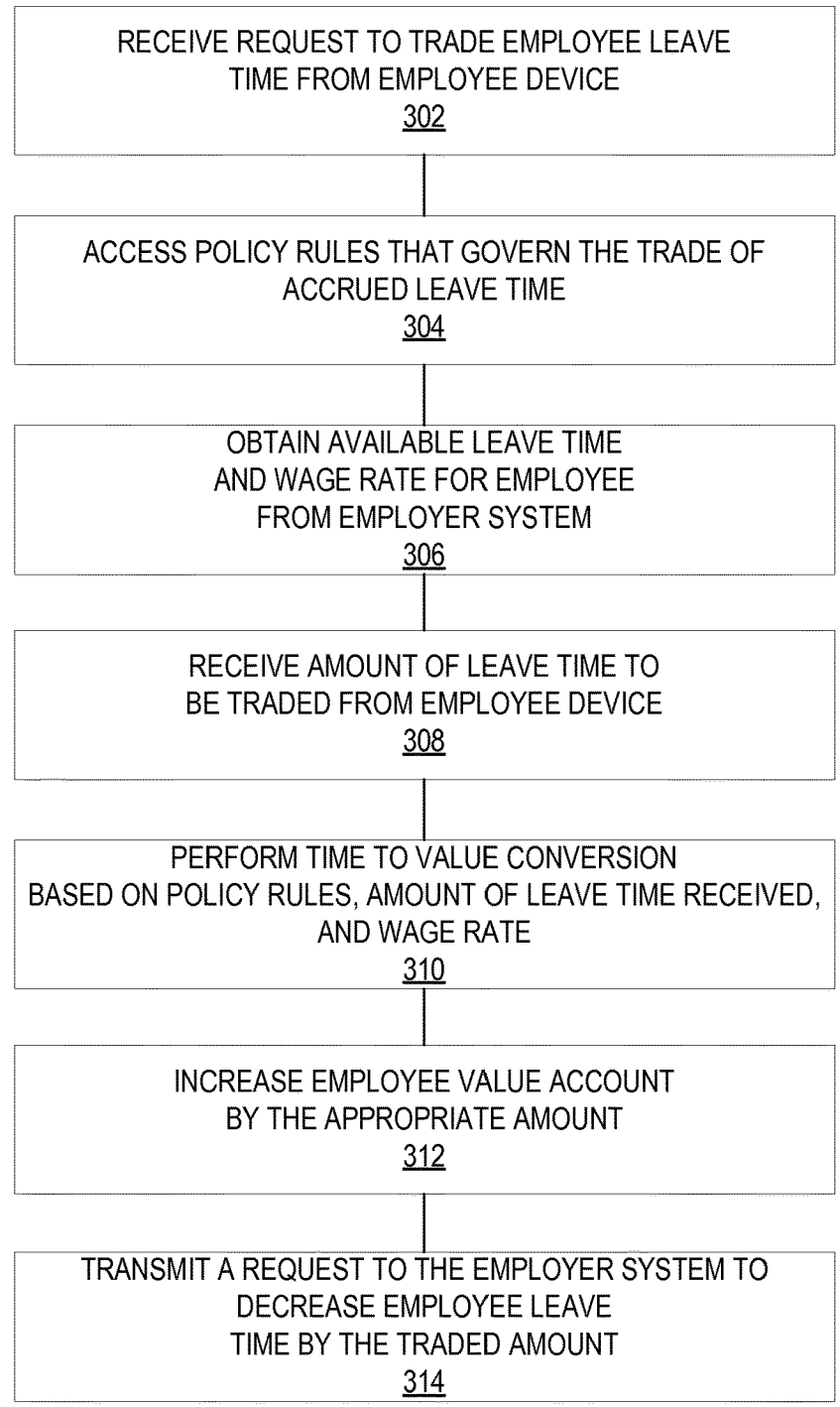
FIG. 3 is a flow chart illustrating operations of a trading system in trading leave time of an employee according to one embodiment.

FIG. 3 is a flow chart illustrating operations of the trading system 110 in trading leave time of an employee according to one embodiment. Assume for purposes of this example that the employee has a value account with the trading system 110 and that there is certain authentication information (e.g., a user identifier and password) associated with the account. Further assume, that through an employee device 102 the employee provides the authentication information to log in to the system 110 to access the functionality of the trading system 110.

When the employee requests to trade leave time accrued by the employee from an employer, the trading system 110 receives 302 the request from the employee device 102. The trade request comprises trading accumulated leave time for a related value which may be used to purchase items from merchants. The trading system 110 accesses 304 policy rules that govern the conversion of accrued leave time to the related value. In one embodiment, the policy rules are stored at employer system 106 and maintained by the employer. In another embodiment, the policy rules are stored by the trading system 110 and updated based on information provided by the employer.

The trading system 110 obtains 306 from the employer system 106 the available leave time that has been accumulated by the employee and the wage rate for the employee. The trading system 110 receives 308 from the employee device 102 the amount of time the employee has indicated that he wishes to trade to a related value. In one embodiment, the obtained available time is presented to the employee prior to the employee indicating the amount to trade. In one embodiment, based on the policy rules, the employee is limited to the amount of time the employee can trade. For example, the employee may only be able to trade up to 50% of the accumulated leave time.

The trading system 110 performs 310 a time to value conversion based on the policy rules, the indicated amount to be traded, and the wage rate. In one embodiment, based on the policy rules, the trading system 110 performs the time to value calculation by multiplying the indicated amount of time to be traded by the wage rate of the employee. The result of the time to value conversion is a related value.

In other embodiments, additional factors may be considered in performing the time to value calculation, such as an employer discount. For example, the result of the time to value calculation could be additionally multiplied by a discount percentage, reducing the related value amount for the employee and thereby allowing the employer to recoup a portion of the value amount. Such a policy rule would allow for improved financial performance of the employer while also providing a small disincentive for the employee to convert all of their available leave time to a related value.

Additionally, the trading system 110 may compute any required payroll tax obligations by the conversion of the leave time, which may be treated as ordinary income depending on the jurisdiction. The tax obligations may be deducted, for example, from the related value or from future wages of the employee (e.g., instruct the payroll system 104 to deduct the tax obligations in the employee's next pay cycle). In one embodiment, the deduction of the tax obligations is initiated upon conversion of the leave time. In another embodiment, the deduction of the tax obligations is initiated when the converted related value is used by the employee in a transaction (e.g., when the employee uses the related value to purchase one or more items).

The trading system 110 increases 312 the employee's value account (e.g., a value/balance of the account) by the related value amount. The trading system 110 additionally transmits 314 a request to the employer system 106 to decrease the employee's leave time by the traded amount. In another embodiment, the request to decrease the employee's leave time is not sent until after the value amount is used by the employee in a transaction (e.g. a purchase transaction of items).

Figure 4:
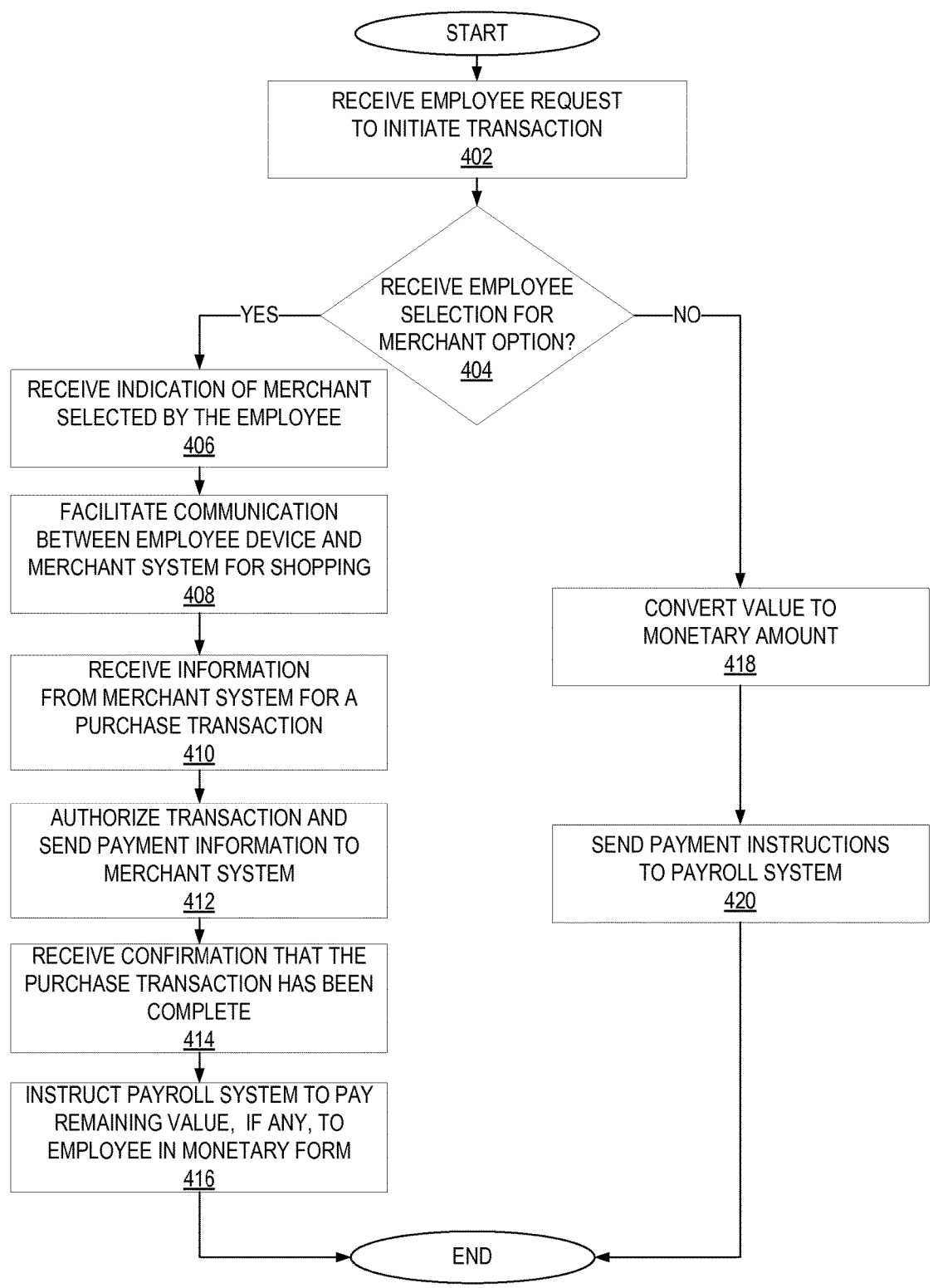
FIG. 4 is a flow chart illustrating operations of a trading system in processing a transaction request according to one embodiment.

FIG. 4 is a flow chart illustrating operations of the trading system 110 in processing a transaction request according to one embodiment. Assume for purposes of this example that an employee has traded leave time for a related value that has been added to the employee's account. The trading system 110 receives 402 from an employee device 102 of the employee, an employee initiated request to initiate a transaction using the value which resulted from trading the employee's leave time. The trading system 110 determines 404 whether the transaction involves using the value to purchase one or more items or converting the value to a monetary amount.

If the transaction involves purchasing one or more items, the trading system 110 receives 406 from the employee device 102 an indication of a merchant selected by the employee for shopping. The employee selects the merchant from multiple available merchants. In one embodiment, the merchants available to the employee are selected by the employer and included in the policy rules. In this way, the employer may, for example, only make travel related goods and services available to the employee.

The trading system 110 facilitates 408 communication between the employee device 102 and the merchant system 108 of the selected merchant. The trading system 110 may facilitate communication by, for example, providing a link to the merchant system 108 or directing the employee device 102 to communicate with the merchant system 108 (e.g., directing device 102 to request a webpage of the merchant system 108). The employee device 102 may communicate directly with the merchant system 108 or may communicate through the trading system 110 (e.g., the trading system 110 acting as a proxy).

The employee device 102 communicates with merchant system 108 to shop for items. In one embodiment, the trading system 110 transmits to the merchant system 108 the related value amount that the employee has to spend. In this way, the merchant system 108 can make the employee aware of the available amount.

When the employee has selected one or more items to purchase and requests to checkout, the trading system 110 receives 410 from the merchant system 108 transaction information describing a purchase transaction of the one or more items. The transaction information may include one or more of the following: the amount of the transaction (e.g., grand total), tax amount, shipping costs, shipping address, and identifier of items being purchased.

If the amount of the transaction is less than the available related value amount, the trading system 110 authorizes 412 the transaction and sends payment information to the merchant system 108 so that the merchant system 108 can complete the transaction. In one embodiment, the payment information includes account information of the employer. The account information may be, for example, credit card information of an employer's credit card (e.g., credit card number and expiration date) or bank account information of the employer (e.g., account number and bank routing number). In one embodiment, if the transaction amount is greater than the available value, the trading system 110 rejects the transaction. In another embodiment, even if the amount of the transaction is greater than the available amount, the trading system 110 authorizes the transaction as long as the employee funds the difference between the transaction amount and the available amount using personal funds (e.g., using a personal credit card) or agrees to have the difference deducted from leave time accrued in the future. Once the purchase transaction is completed by the merchant system 108, the trading system 110 receives 414 from the merchant system 108 confirmation that the transaction has been completed.

In some cases, the available related value amount is not fully utilized in the purchase transaction (there is remaining value after deducting the amount of the purchase transaction). This can happen, for example, if policy rules require that a whole number of leave hours be converted at a time or if the employee overestimates the value amount he will need and trades more leave time than is needed. If the related value amount is not fully utilized in the purchase transaction, the trading system 110 instructs 416 the payroll system 104 to pay the employee the remaining value as a monetary amount. The monetary amount may be equivalent to the remaining value, greater than the remaining value, or a fraction of the remaining value (e.g., to discourage having a remaining value). In another embodiment, the trading system 110 maintains the remaining value in the employee's value account for future purchase transactions.

Returning to step 404, if the trading system 110 determines that the transaction involves converting the related value of the employee's value account to a monetary amount, the trading system 110 converts 418 the related value to a monetary amount. In one embodiment, the trading system 110 multiplies the related value by a conversion factor to determine the monetary amount. The trading system 110 sends 420 payment instructions to the payroll system 104 to pay the employee the converted monetary amount.

Those of skill in the art will recognize that other embodiments can perform the steps of FIGS. 3 and 4 in different orders. Moreover, other embodiments can include different and/or additional steps than the ones described here.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by real time network operating systems. The disclosure of the embodiments is intended to be illustrative, but not limiting, of the full scope of the invention, which is set forth in the following claims.

What is claimed is:

1. A computer-implemented method comprising:
receiving, by a computing trading system from a computing employer system, an indication of leave time accrued by an employee from an employer;
receiving, by the trading system from an employee device associated with the employee, an amount of the leave time selected by the employee for trading;
determining, by the trading system, a real-time related value based on a combination of policy rules, employer discount, wage rate, and the selected amount of leave time;
transmitting, by the trading system to the employer system, instructions to adjust the leave time accrued by the employee based on the selected amount of leave time;
transmitting, by the trading system, to a merchant system associated with a merchant, the related value, the merchant selected by the employee from a plurality of merchants;
receiving, by the trading system from the merchant system, transaction information describing a purchase transaction to purchase one or more items from the selected merchant based on the related value, the one or more items selected by the employee;
transmitting, by the trading system to the merchant system, payment information to complete the purchase transaction; and
transmitting for display on a client device the adjusted leave time,
wherein the purchase transaction results in a remaining balance based on a difference between the purchase transaction and the related value,
wherein employee leave time is automatically deducted in the future by the employer system if the difference is less than zero, and
wherein a monetary amount is paid to the employee based on the remaining balance if the difference is greater than zero.

2. The method of claim 1, wherein based on one or more policy rules the employee is limited in the amount of leave time that can be selected for trading.

3. A computer-implemented method comprising:
identifying, by a trading system, leave time accrued by an employee from an employer;
determining, by the trading system, a real-time related value based on a combination of policy rules, employer discount, wage rate, and the leave time;
receiving, by the trading system from a merchant system associated with a merchant, transaction information describing a purchase transaction to purchase one or more items from the merchant based on the related value, the one or more items selected by the employee;
authorizing, by the trading system, completion of the purchase transaction based on the related value; and
transmitting for display on a client device the adjusted leave time,
wherein the purchase transaction results in a remaining balance based on a difference between the purchase transaction and the related value,
wherein employee leave time is automatically deducted in the future by an employer system if the difference is less than zero, and
wherein a monetary amount is paid to the employee based on the remaining balance if the difference is greater than zero.

4. The method of claim 3, wherein identifying the leave time comprises:
receiving from an employer system an indication of the leave time accrued by the employee from the employer.

5. The method of claim 3, wherein determining the related value comprises:
receiving from an employee device associated with the employee, an amount of the leave time selected by the employee for trading.

6. The method of claim 5, wherein the selected amount of leave time and the wage rate are multiplied to determine the related value.

7. The method of claim 3, further comprising:
transmitting, by the trading system to an employer system, instructions to adjust the leave time accrued by the employee based on the related value determined.

8. The method of claim 7, wherein the instructions to adjust the leave time are transmitted to the employer system responsive to determining the related value.

9. The method of claim 7, wherein the instructions to adjust the leave time are transmitted to the employer system responsive to completion of the purchase transaction.

10. The method of claim 3, further comprising:
transmitting, by the trading system to the merchant system, payment information to complete the purchase transaction.

11. A computer program product stored on a non-transitory computer-readable storage medium having computer-executable instructions, the computer-executable instructions when executed causing a process to be performed comprising:

identifying, by a trading system, leave time accrued by an employee from an employer;

determining, by the trading system, a real-time related value based on a combination of policy rules, employer discount, wage rate, and the leave time;

receiving, by the trading system from a merchant system associated with a merchant, transaction information describing a purchase transaction to purchase one or more items from the merchant based on the related value, the one or more items selected by the employee;

authorizing, by the trading system, completion of the purchase transaction based on the related value; and transmitting for display on a client device the adjusted leave time, wherein the purchase transaction results in a remaining balance based on a difference between the purchase transaction and the related value, wherein employee leave time is automatically deducted in the future by an employer system if the difference is less than zero, and wherein a monetary amount is paid to the employee based on the remaining balance if the difference is greater than zero.

12. The computer program product of claim 11, wherein determining the related value comprises:

receiving from an employee device associated with the employee, an amount of the leave time selected by the employee for trading.

13. The computer program product of claim 11, further comprising:

transmitting, by the trading system to an employer system, instructions to adjust the leave time accrued by the employee based on the related value determined.

* * * * *